Oct. 27, 1964 A. JAVAN ETAL 3,154,748
DETECTOR FOR OPTICAL COMMUNICATION SYSTEM
Filed Dec. 29, 1961
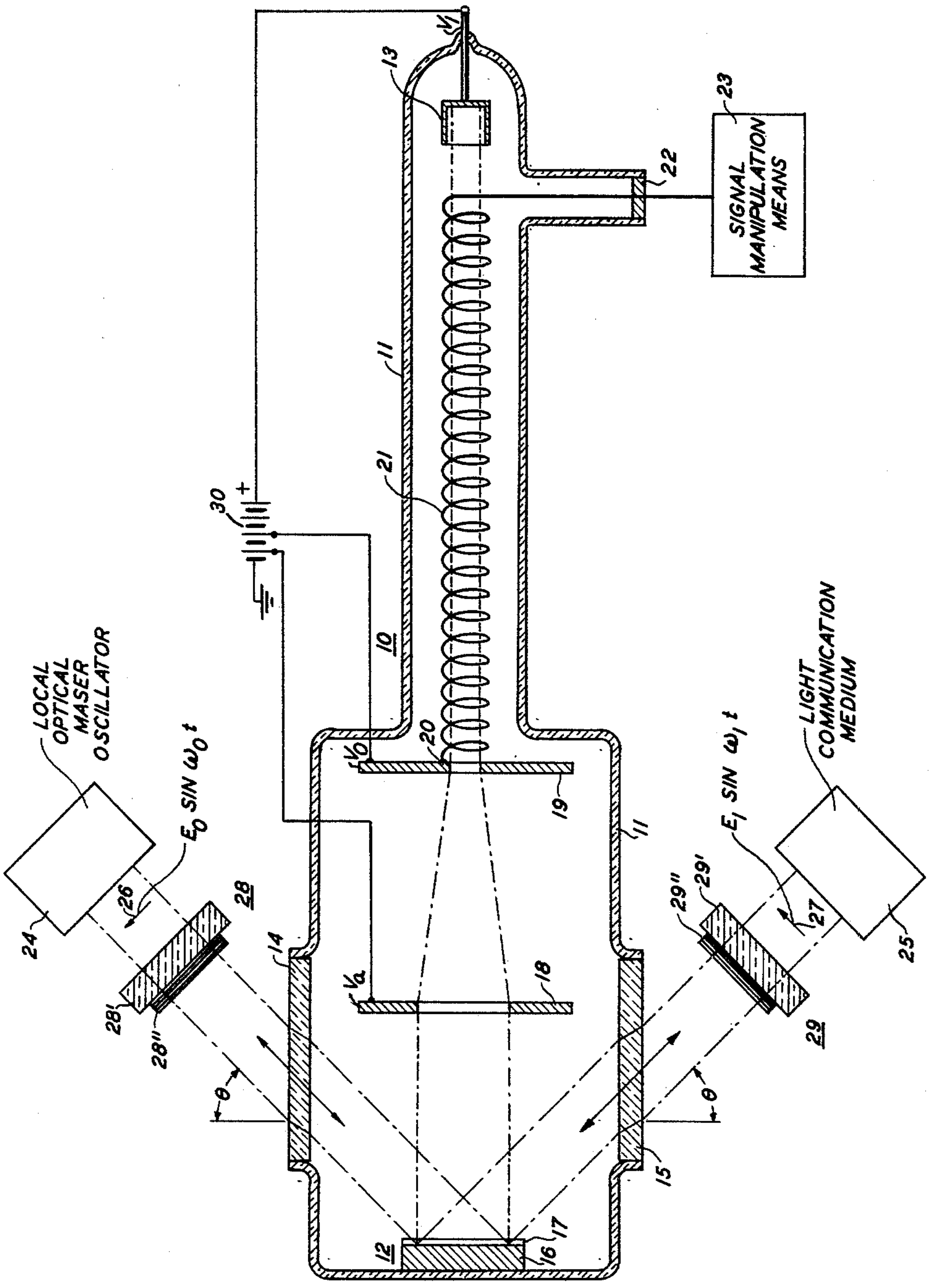
INVENTORS: A. JAVAN
R. KOMPFNER
BY Kenneth W. Mater
ATTORNEY United States Patent Office 3,154,748

Patented Oct. 27, 1964

3,154,748

DETECTOR FOR OPTICAL COMMUNICATION SYSTEM

Ali Javan, Cambridge, Mass., and Rudolf Kompfner, Middletown, N.J., assignors to Bell Telephone Laboratories, Incorporated, New York, N.Y., a corporation of New York Filed Dec. 29, 1961, Ser. No. 163,337
7 Claims. (Cl. 329—144)

This invention relates to radiant energy transmission and more particularly to receivers for use in transmission systems operating at or near optical frequencies.

In the area of transmission of signal bearing electromagnetic wave energy from point to point, there has been a constant expansion of the useful range of operating frequencies. In general, the trend is toward higher and higher frequencies. Recently the advent of a continuously operable maser capable of generating coherent radiation in the $10^{-2}$ to $10^{-6}$ centimeter optical wavelength region as described in an article appearing in Physical Review Letters, February 1, 1961, at page 106, and entitled "Population Inversion and Continuous Optical Maser Oscillations in a Gas Discharge Containing a He–Ne Mixture," by A. Javan, W. R. Bennett, Jr., and D. R. Heriott, has intensified the interest in the transmission of signal information on a modulated "light beam." Use of a solid state optical maser is also feasible.

However, together with the opening up of this new frequency range of communication has come the realization that many of the well known signal manipulation techniques and structures common in the lower frequency ranges are no longer applicable. Accordingly, new techniques and associated structures in certain areas must be devised.

One such area of signal manipulation involves the reception and detection of the distantly transmitted information.

As disclosed in an article by A. T. Forrester, R. A. Gudmundsen, and P. O. Johnson, entitled "Photoelectric Mixing of Incoherent Light," which appeared at page 1691 in volume 99 of "Physical Review" (September 1955), the use of photoelectric emission from a photocathode illuminated by a modulated optical carrier represents a particularly attractive method of detection. However the photocurrent produced by the ordinary photo emission process alone is of such low magnitude that amplification is necessary if the resultant signal is to be in usable form. Typically, a secondary-emission photomultiplier following the photocathode produces substantial amplification of the emitted signal, with a small increase in noise. However, at optical frequencies, carrier modulation typically exceeds one kilomegacycle. For such wide band frequency spreads, photomultiplication ceases to provide attractive amplification.

It is therefore an object of the present invention to receive and detect wideband-modulated optical frequency carrier wave signals.

It is a more specific object of the present invention to amplify the broadband signal emitted by the photocathode in an optical wavelength communications system receiver.

One of the reasons amplification is necessary is found in the low amplitude level of the electron stream produced in an ordinary photoemissive device. Thus if the efficiency of the photoemission process is increased, either the repeater spacing may be increased or the amount of amplification required at each repeater station may be decreased.

It is accordingly a further object of the present invention to improve the efficiency of a photocathode device.

In accordance with the present invention, modulated optical wavelength signal energy from a long distance communication medium and optical wavelength energy from a constant frequency source simultaneously illuminate a photo-emissive surface which is reflective and which forms one portion of an optically resonant cavity. Since the photocathode is selected to possess a nonlinear characteristic, this superimposition of constant frequency and modulated carrier signals produces an electron current containing successive amplitude reinforcements and depressions, or "beats," at their sum and difference frequencies. The sum frequency is unrecognizable in the structure of interest while the difference frequency, typically in the microwave range, is amplified in a slow wave structure and coupled therefrom by means of well known techniques. Subsequent amplification or other manipulation of the signal information which originated at the distant transmitter is then possible.

In accordance with one preferred embodiment of the invention, the photoemission and amplification processes take place in a single electron tube, one end of which is part of an optically resonant interferometer cavity, the other end of which forms a traveling wave type amplifier. Energy from the constant frequency oscillator and from the transmission medium passes through first and second separate semitransparent mirrors and windows of optical quality at the critical angle of low reflective loss known as the Brewster angle and are incident upon the photocathode of the detector tube. The energy beam incident upon the photocathode is reflected therefrom toward the opposite semitransparent mirror through which the other optical beam originally entered. Rereflections between the two semitransparent external mirrors via the cathode result in an increased photoelectric conversion efficiency at the photocathode, thereby raising the amplitude level of the generated photoelectron stream. After its generation at the photocathode, the resultant electron stream is focused into a narrower beam which passes to the collector through a synchronous helical structure. Interaction between the electron stream passing axially through the helix and the slow wave coupled to and passing circumferentially along the helix produces an amplification of the latter in the well known manner of traveling wave tube operation. The extremity of the helical member carrying the amplified signal wave extends through the tube wall and the signal is available there for further manipulation if so desired.

The above and other objects of the present invention, its nature and mode of operation, and its other advantages and features will become more readily apparent from reference to the accompanying drawing in which the single figure is a plan view of an optical detector in accordance with the invention.

Referring more particularly to the figure, there is shown a phototube 10 for demodulation of signal bearing optical frequency carrier waves. Phototube 10 is fundamentally an electron tube comprising elongated glass envelope 11 with cathode 12 and collector anode 13 spaced at opposite extremities thereof. Envelope 11 is characterized by two distinct portions, the first of which is of greater diameter and appears to the left in the figure, the second of which is of lesser diameter and appears to the right in the figure. The portion of greater diameter can be termed the input portion; that of lesser diameter, the output portion. Envelope 11 has three apertures associated therewith. Spaced diametrically opposite each other in the input portion of envelope 11, and forming a portion of the wall thereof are plane windows 14, 15 which are set into envelope 11, and which comprise glass of optical quality. Windows 14, 15 are as thin as possible consistent with a vacuum tight mechanical seal to envelope 11. The extremity of the input portion of envelope 11 is flattened, and disposed thereon in a plane essentially normal to the parallel planes in which windows 14, 15 lie, is cathode 12.

The properties of cathode 12 are dual and involve both the emission of an electron stream when illuminated with optical or near optical frequency electromagnetic wave energy as well as the reflection of the incident light energy not converted thereby into energy of the photoelectron stream toward external rereflecting means to be described hereinafter. As a typical example, cathode 12 comprises a highly reflective steel member 16 having a very thin near-transparent layer 17 of a photon responsive substance such as antimony cesium oxide deposited on the outer surface thereof. When antimony cesium oxide is illuminated with optical frequency electromagnetic wave energy, i.e., photons, a stream of electrons is emitted, the amplitude of which depends upon the instantaneous square of the total electric field at the photocathode. Materials other than antimony cesium oxide may, of course, be used so long as they possess a nonlinear emission characteristic.

Also positioned within the portion of envelope 11 of greater diameter are electrodes 18, 19 the function of which is to accelerate and to focus the stream of electrons emitted at cathode 12. Electrode 18 comprises a metallic plate having a central aperture through which the electron stream passes, and is held at a potential $V_a$ by schematically illustrated potential source 30 which is sufficient to accelerate the electrons away from the cathode. Electrode 19, also a metallic plate, is positioned at the mouth of the portion of envelope 11 of lesser diameter and has a central aperture of diameter smaller than that of electrode 18. Electrode 19 is maintained by source 30 at a potential $V_0$, which is higher than $V_a$. Thus the electron stream in passing from photocathode 12 through electrode 19 is electrically focused into a narrow beam suitable for amplification in the remaining portion of envelope 11. A uniform magnetic field can also be used for focusing the electron beam, as is well known in the microwave tube art.

Electrically connected to electrode 19 at point 20 is helix 21 of radius $a$ which extends nearly the entire length of the portion of envelope 11 of lesser diameter. Helix 21 is typically a metallic conductor and, for maximum bandwidth, is proportioned such that $$\frac{2\pi a}{\lambda_e} \cong 1.5$$

where $\lambda_e$ is the product of the free space wavelength of energy at the frequency of interest and the ratio of the velocity of propagation of the electron stream in the helix divided by the velocity of light. The conductor forming helix 21 passes out of the envelope 11 through an insulated vacuum seal 22 and is there available for external connection to signal manipulation means 23, which may be an additional amplifier or other circuit means. Other means of coupling the energy out through the glass envelope 11, such as capacitively to a wave guide, or by means of an external helix, can, of course, be substituted. Beyond the point at which helix 21 terminates, and occupying a position which corresponds to an extension of the helix, is collector 13, which is maintained by source 30 at a potential $V_1$ which is greater than the potential $V_0$. Thus the electron stream emitted at photocathode 12, having a negative charge, is attracted to and terminates upon collector 13.

Returning now to the portion of envelope 11 of greater diameter, it may be seen that energy sources 24, 25 are located external thereto and are positioned to illuminate cathode 12 simultaneously through windows 14, 15 respectively. Source 24 is a source of coherent optical frequency energy such as an optical maser oscillator and may be either locally or distantly situated with respect to the detector 10. As illustrated in the figure, source 24 is termed "local," but the invention is not to be limited in this respect. Source 25 is the signal bearing coherent optical frequency energy available at the terminus of a light communication system such as a light pipe.

Typically, the energy level of source 25 is considerably below that of source 24 due to transmission attenuation of the former. The energy from each of sources 24, 25 represented respectively by arrows 26, 27 is assumed to be in the form of plane parallel waves and passes through endplates 28, 29 and through windows 14, 15 into the interior of envelope 11, where it illuminates cathode 12.

Endplates 28, 29 comprise, respectively, transparent optical quality dielectric plates 28′, 29′ with a plurality of thin layers 28″, 29″ of dielectric material disposed on that side of plates 28′, 29′ nearer envelope 11. Layers 28″, 29″ cause the endplates to be highly reflective for energy directly incident thereon, and also to transmit energy incident first upon dielectric plates 28′, 29′. Thus these endplates are semitransparent.

Endplates 28, 29 and energy sources 24, 25 are positioned with respect to envelope 11 such that the flat surfaces of the windows 14, 15 are inclined to the axial optical energy path therethrough at an angle $\theta$ which is substantially defined by the relation $$\theta = \tan^{-1}\sqrt{\frac{\epsilon_2}{\epsilon_1}}$$

where $\epsilon_1$ and $\epsilon_2$ are, respectively, the dielectric constants of the dielectric material forming windows 14, 15 and of the medium between the windows and the endplates, typically air. The angle defined by the above relation is commonly known as the Brewster angle, sometimes employed heretofore in polarizing devices. It is characteristic of a Brewster angle device that incident energy components having their electric vectors in the plane of incidence are transmitted with minimum reflection whereas incident energy components having their electric vectors normal to the plane of incidence are reflected to a considerable extent.

In the operation of the detector shown in the single figure, modulated plane polarized wave energy from light communication medium 25, of mathematical form $E_1 \sin \omega_1 t$, is incident upon semitransparent endplate 29 and is transmitted thereby toward window 15 as a plane parallel wave. By properly positioning the detector, the axis of the incident rays intersects the plane of window 15 at the Brewster angle as defined hereinabove. Passing through window 15, and being slightly refracted thereby, the signal bearing energy propagates toward cathode 12. Simultaneously, energy from local optical maser 24 and having the mathematical form $E_0 \sin \omega_0 t$ passes through endplate 28 and window 14, also at the Brewster angle, and propagates toward cathode 12. The frequency $\omega_0$ is constant and differs from the carrier frequency from source 25 by an amount in the microwave range. Thus, for example, if the carrier frequency is $10 \times 10^{14}$ cycles and the local oscillator frequency is $9.99997 \times 10^{14}$ cycles, the difference frequency would be 3 kilomegacycles.

In this connection it can be seen that if the constant frequency, $\omega_0$, is made equal to the carrier frequency of the signal modulated energy, the resultant difference frequency of the electron current is the original modulating signal alone. On the other hand, if constant frequency $\omega_0$ is different from that of the carrier signal, the electron current will be a microwave subcarrier modulated at the signal frequencies.

As described hereinabove, layer 17 of cathode 12 is photosensitive and causes an electron stream to be emitted, the level of which is proportional in this case to the square of the instantaneous E field at the cathode. When the two externally produced energy beams are incident upon the cathode, the square law characteristic thereof produces both the sum and the difference frequencies involved. The sum frequency is, in the environment of a traveling wave type tube, unrecognizable, and may therefore be neglected. The difference frequency however, being in the microwave range, can be further manipulated, once extracted from the electron stream.

Returning now to the cathode surface, it may be seen that a plane wave front proceeding from either source does not instantaneously illuminate this surface since the wave front and cathode surface are angularly related. Instead an equiphase wave front moves across the cathode surface as forward propagation continues. It is at this point that the reflective nature of layer 16 of cathode 12 becomes important. It is well known that only a fraction of the energy from sources 24, 25 is converted upon initial cathode incidence into photoelectrons proceeding at right angles from the layer 17 toward helix 21. A major portion of the incident energy is not so converted however. In order to utilize this energy to increase the photoelectric efficiency, layer 16 of cathode 12 is made highly reflective so that incident energy not otherwise converted may be reflected, at an angle equal to the angle of incidence, away from the cathode surface. Thus, a major portion of the energy from source 25 is reflected by layer 16 toward endplate 28 and, by the same process a major portion of the energy from source 24 is reflected toward endplate 29. Upon reaching these endplates, and by virtue of the reflective nature of layers 28″, 29″ the energy is reflected directly back toward the cathode where additional photoelectric conversion occurs. Again a portion of the incident energy is not converted and is reflected by layer 16 once more, this time toward the respective endplates through which the energy originally entered, where a rereflection occurs. It may thus be seen that the combination of layer 16 of cathode 12 and endplates 28, 29 acts as a multiple reflection chamber, or interferometer, which causes repeated reflections and rereflections of the incident energy, thereby raising the efficiency of the photoelectric conversion process.

It may easily be appreciated that the exact positioning of external reflecting endplates 28, 29 with respect to each other and with respect to cathode 12 is of particular importance. It is desirable that the angle and separation of the external plates be adjusted to produce equal path lengths between the reflectors via the cathode for all portions of the energy beams. Likewise the angle of incidence upon the cathode for both energy beams is advantageously equated. These adjustments are necessary to preserve phase relationships in the interferometer cavity. If the adjustment is not precise, destructive phasal interference will occur on the cathode surface, resulting in deterioration of the signal information.

Returning now to the photocathode and to the energy incident thereon, the photocurrent amplitude at the frequency $\omega_1-\omega_0$ produced is in the form $$|i_s|=K\alpha\sqrt{P_1P_0}$$

where $\alpha$ is a constant determined in part by the probability that a photon will cause the emission of a photoelectron from surface 17, $P_1$ and $P_0$ are the mean values of the incident signals in watts, and K is a constant, greater than unity, which depends upon the increased photoelectric conversion produced by the reflection process in the interferometer cavity.

It should be noted at this point, that since the frequency of interest in tube 10 is in the microwave range, not the optical range, the size of the reflection components as well as their deviation from perfect flatness may be large with respect to the optical wavelengths involved and simultaneously small with respect to the microwave wavelengths.

Thus the reflection components, which typically are dimensioned to be of the order of one wavelength, are in the one to five centimeter range, while maximum allowable deviations from surface flatness, typically one-twentieth of a wavelength, are in the .05 to .25 centimeter range. In a purely optical frequency environment these dimensions would be between $10^{-2}$ to $10^{-6}$ times smaller, requirements which are difficult to meet.

The generated photoelectron stream is focused at electrode 18 and is sent into helix 21 at a potential $V_0$. Neglecting space charge forces and attenuation in the helix, the square of the alternating current components of the current $i_s$ will increase with distance traveled, and the amount of amplification obtainable will be limited by the value of the D.C. amplitude of the electron stream $i_0$ relative to the signal amplitude $i_s$. Specifically, $$G_{max}=\left(\frac{i_0}{i_s}\right)^2$$

After amplification, a voltage signal proportional to $i_s$ is available at signal manipulation means 23 for electrical operations such as further amplification, band separation filtering, and the like. In this manner, wide band signal information frequency modulated onto an optical frequency carrier for transmission purposes may be converted with relative ease to the microwave modulating signal alone or to a microwave subcarrier signal which is frequency modulated with the original signal information.

In the description above, the combination of an optical superheterodyning reflection cavity with a traveling wave tube helix amplifier has been described in detail. However, such a disclosure should not be construed as limiting the invention to that particular combination. Indeed any of the well-known microwave tube amplifying structures can be employed with the interferometer cavity and the superheterodyning process to obtain a detector for optical wavelength energy. In many cases such a combination would be more particularly suited for certain applications. Thus a klystron tube could be used in combination with the photo sensitive cathode and the cavity when narrow band microwave signals are involved. Furthermore, the cavity and cathode could be combined with parametric amplifier structures or velocity jump type structures. Also, one of these latter amplification methods may be used as a preamplification means in combination with a traveling wave tube helix.

Furthermore, the Brewster angle windows and the external reflecting surfaces can be made integral with the tube envelope by extending the envelope outward at the window location to engage the reflecting endplates. Thus only the signal sources would be external to the detector. Likewise, the reflecting endplates can be made concave with their focal points on the photocathode surface. Such an arrangement, while concentrating the incident energy upon a more restricted portion of the cathode, would reduce diffraction losses at the external reflecting surfaces.

In all cases, it is to be understood that the above described arrangements are intended to be illustrative of some of the specific embodiments which can represent an application of the principles of the present invention. Numerous and varied other arrangements could be devised in accordance with these principles by those skilled in the art without departing from the spirit and scope of the invention.

What is claimed is:

1. Apparatus for recovering signal wave information from a modulated optical wavelength carrier comprising
   - a photoemissive layer disposed upon an energy reflecting surface,
   - means for illuminating said layer with signal modulated optical wavelength energy,
   - means for rereflecting toward said layer the portion of said signal energy reflected from said surface,
   - means for generating coherent optical wavelength energy of a substantially single constant frequency,
   - means for illuminating said layer with said constant frequency optical wavelength energy, said last mentioned illumination being simultaneous with the illumination of said layer with said signal modulated optical wavelength energy,
   - means for rereflecting toward said layer the portion of said constant frequency energy reflected from said surface, the illumination of said photoemissive layer by said signal modulated and said constant frequency optical wavelength energy producing the emission of a stream of photoelectrons from said layer, and means for extracting from said photoelectron stream a frequency modulated subcarrier having an instantaneous frequency equal to the difference between the instantaneous frequency of said signal modulated optical wavelength energy and said constant frequency, said extracting means comprising a slow wave circuit positioned in coupling relationship to said photoelectron stream.

2. Apparatus for recovering signal wave information from a modulated optical wavelength carrier comprising an electrically insulating envelope enclosing a cathode and an anode having electron stream amplification means disposed therebetween, said cathode being substantially reflective, first and second means for transmitting therethrough wave energy at optical frequencies when incident thereupon in a given direction and for reflecting said wave energy when incident thereupon in a direction opposite to said given direction, said first and second means being positioned diametrically opposite each other about said envelope, and means for admitting said energy into said envelope with low reflective loss, said last recited means comprising plane windows forming the portions of said envelope intercepted by energy beams propagating between said reflecting means and said cathode and parallel to said given direction.

3. In combination, a photoemissive surface on an energy reflecting cathode having an essentially plane surface, said surface being characterized by the emission of a stream of electrons in response to photon illumination thereof, means for simultaneously illuminating said surface with first and second beams of optical frequency electromagnetic wave energy, said beams having axial paths which are related to said plane surface at an angle substantially different from 90°, means for rereflecting back toward said surface the portion of the energy in said beams which is reflected by said cathode, and means for amplifying the signal represented by the amplitude fluctuations of the said electron stream emitted by said surface in response to said illumination.

4. The combination according to claim 3 in which said beams pass through optical windows positioned at the Brewster angle with respect to said axial paths.

5. The combination according to claim 4 in which said rereflecting means comprise surfaces which transmit said beams therethrough when incident from one direction and reflect energy incident from a second direction 180° opposite to said one direction.

6. The combination according to claim 4 in which said amplifying means comprise a slow wave structure positioned in coupling relationship to said electron stream between said cathode and an anode.

7. An optical frequency detector comprising within an electrically insulating envelope a cathode and an anode with electron stream amplification means disposed longitudinally therebetween, said cathode being substantially reflective, first and second means for transmitting therethrough wave energy at optical frequencies when incident thereupon in one direction and for reflecting said wave energy when incident thereupon in a direction opposite to said one direction, said last recited means being positioned diametrically opposite each other about said envelope, a frequency modulated optical frequency energy beam incident upon said cathode through said first transmitting means, and a single frequency optical energy beam incident simultaneously with said frequency modulated optical frequency energy beam upon said cathode through said second transmitting means, said first and second beams having an in phase relationship over the face of said cathode.

No references cited.